No. 658,406. Patented Sept. 25, 1900.
O. I. STRAUB.
INTERLOCKING BICYCLE.
(Application filed Aug. 5, 1896. Renewed Feb. 24, 1900.)
(No Model.)  3 Sheets—Sheet 1.
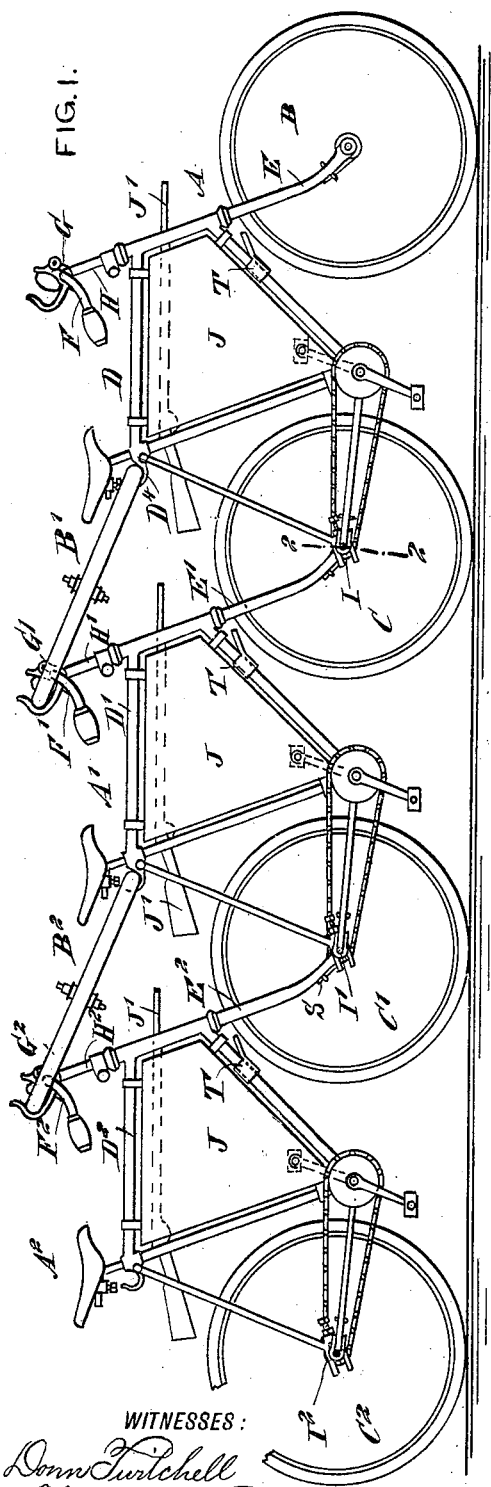
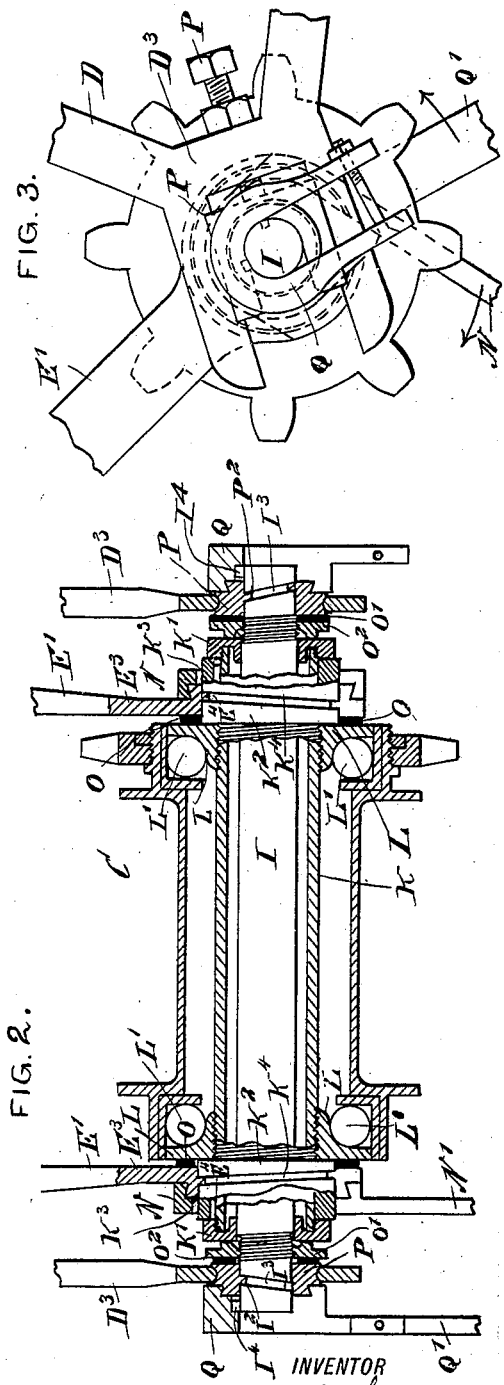
WITNESSES:
INVENTOR
O. I. Straub
BY
ATTORNEYS.
THE NORRIS PETERS CO., PHOTO-LITHO., WASHINGTON, D. C.

No. 658,406. Patented Sept. 25, 1900.
O. I. STRAUB.
INTERLOCKING BICYCLE.
(Application filed Aug. 5, 1896. Renewed Feb. 24, 1900.)
(No Model.) 3 Sheets—Sheet 2.
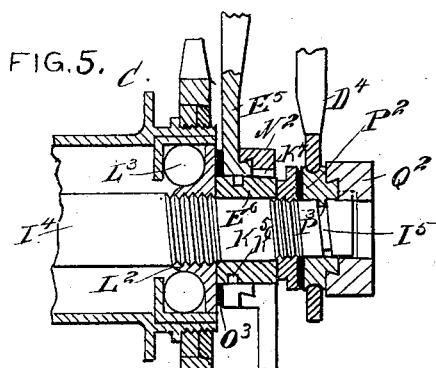
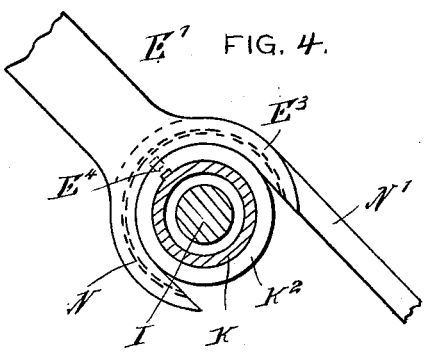
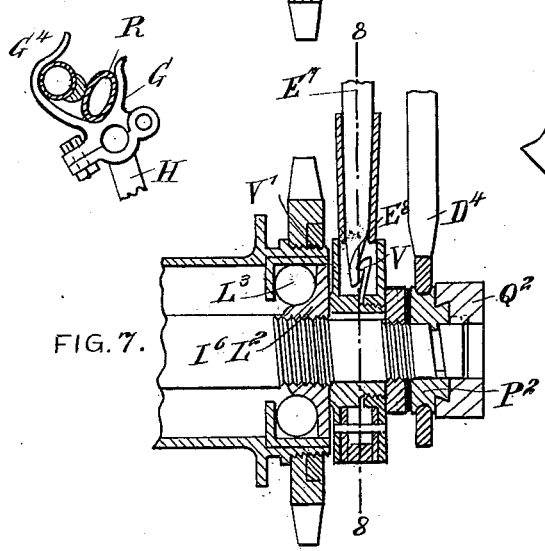
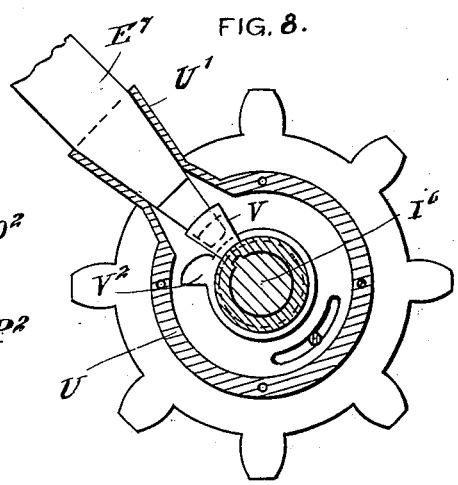
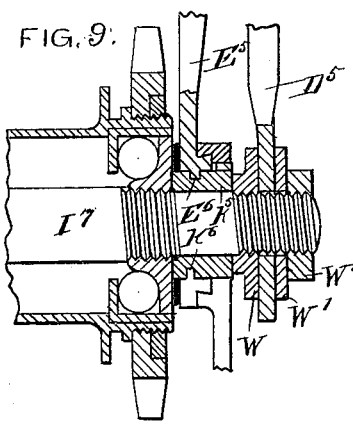
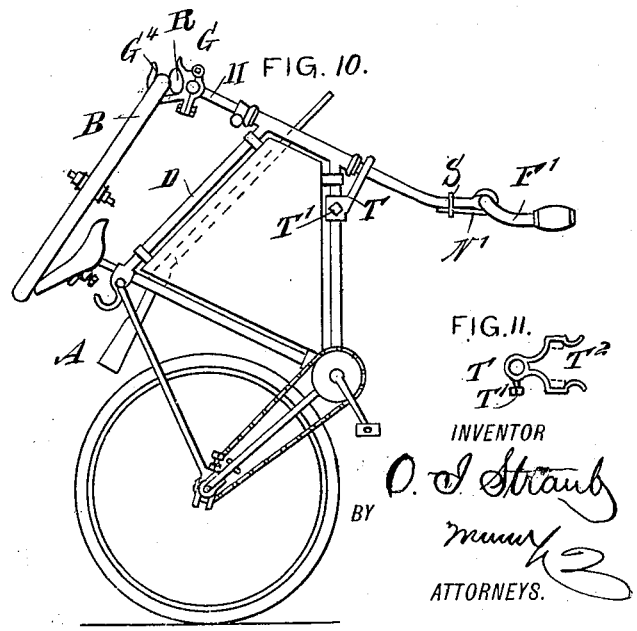
WITNESSES:
INVENTOR
BY
ATTORNEYS.

No. 658,406. Patented Sept. 25, 1900.
O. I. STRAUB.
INTERLOCKING BICYCLE.
(Application filed Aug. 5, 1896. Renewed Feb. 24, 1900.)
(No Model.) 3 Sheets—Sheet 3.
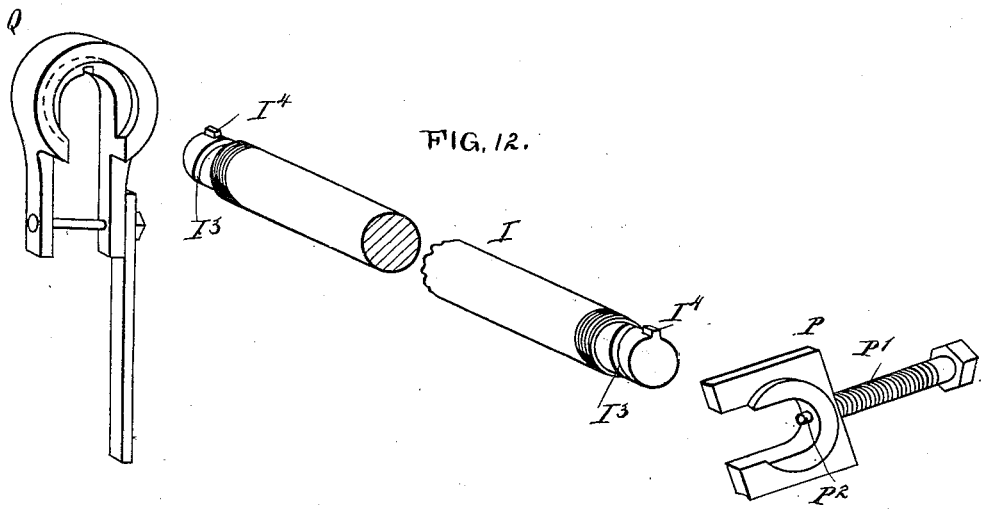
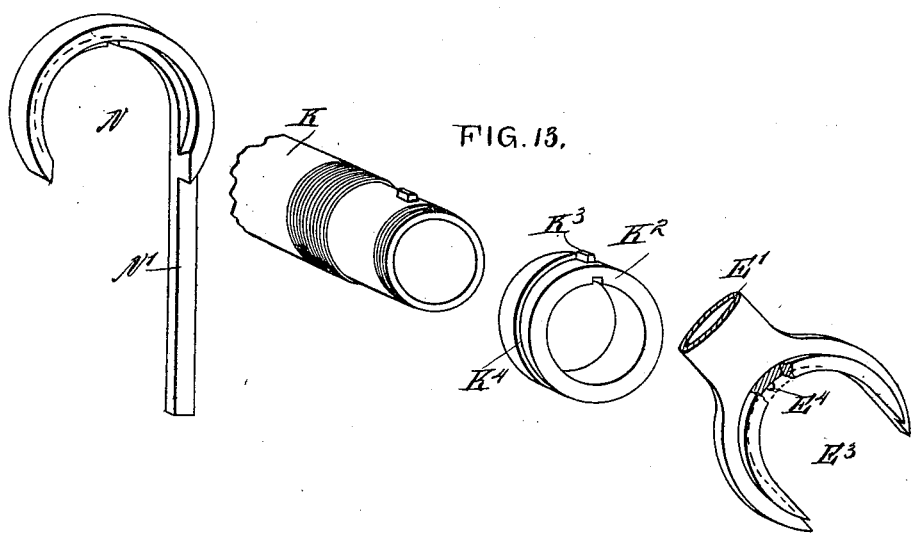
WITNESSES:
Donn Twitchell
INVENTOR
O. I. Straub
BY Munn & Co.
ATTORNEYS.

UNITED STATES PATENT OFFICE.

OSCAR I. STRAUB, OF THE UNITED STATES ARMY.

INTERLOCKING BICYCLE.

SPECIFICATION forming part of Letters Patent No. 658,406, dated September 25, 1900.

Application filed August 5, 1896. Renewed February 24, 1900. Serial No. 6,414. (No model.)

*To all whom it may concern:*

Be it known that I, OSCAR I. STRAUB, of the United States Army, have invented a new and Improved Interlocking Bicycle, of which the following is a full, clear, and exact description.

The object of the invention is to provide a new and improved interlocking bicycle more especially designed for the use of large bodies of troops and arranged to permit of conveniently and quickly converting the entire machine into single bicycles.

The invention consists principally of a series of bicycles arranged one behind the other and of which the front wheel of the following bicycle is removed and its front fork is interlocked with the rear axle of the preceding bicycle, the removed front wheel being carried on the frames of the adjacent interlocked bicycles and forming a brace between said frames.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is an enlarged transverse section of the interlocking device for adjacent bicycles, the section being taken on the line 2 2 of Fig. 1. Fig. 3 is a side elevation of the same. Fig. 4 is a sectional side elevation of the locking device for the front fork, with the parts in an open position. Fig. 5 is a sectional side elevation of a modified form of the interlocking device. Fig. 6 is an enlarged sectional side elevation of the head for the handle-bar stem, with the carried wheel in section. Fig. 7 is an enlarged cross-section of another modified form of interlocking device. Fig. 8 is a sectional front view of the same on the line 8 8 of Fig. 7. Fig. 9 is a cross-section of another interlocking device of modified form. Fig. 10 is a side elevation of a single bicycle arranged for pushing over plowed fields, through underbrush, and the like. Fig. 11 is a plan view of the arm for holding the front fork against turning in the steering-head. Fig. 12 is a perspective view of the spindle, box, and forked locking-arm for the spindle shown detached; and Fig. 13 is a similar view of the spindle-tube, collar, fork, and forked locking-arm for the fork shown detached.

As shown in Fig. 1, the multicycle or interlocking military bicycle is provided with a series of individual bicycles A A' A², placed one behind the other and having the front wheels B B' B², the rear or drive wheels C C' C², and the frames D D' D² provided with front forks E E' E², respectively, the latter having the handle-bars F F' F² removably secured in the heads G G' G², respectively, held on the upper ends of the handle-bar stems H H' H², respectively. The several wheels B B' B² and C C' C² are alike in construction to permit of interchanging the wheels whenever necessary. Otherwise the parts referred to are of any approved construction.

The wheels B' and B² of the bicycles A' and A² are removed from their front forks E' and E², respectively, and the wheel B' is carried between the frame D and the head G', and the wheel B² is carried between the frame D' and the head G². The front forks E' E² are interlocked with the spindles or axles I I', held in the frames D D', respectively, so that the front fork of the succeeding bicycle is interlocked with the rear axle of the preceding bicycle. The removed front wheels B' B² are carried by the adjacent bicycles, so as to have said wheels within convenient reach and at all times in readiness whenever any of the running-wheels C B C' C² are damaged and must be replaced by one of the said wheels B' or B², so as to render the machine still serviceable. It will be seen that by carrying the said wheels B' B² along on the frames of the machines it permits of converting the whole machine into single bicycles when the front forks E' E² are removed from the axles I I' and the said wheels B' B² are placed in position in the several front forks. Thus the bicycles A A' A² are rendered complete in themselves and can be used by individual riders.

As shown in Fig. 1, the frames D D' of the several bicycles carry suitable boxes or packages J for ammunition, clothing, &c., and also rifles J' or other weapons to be used by the troops.

In order to permit of readily disconnecting the interlocked forks from the rear spindles of the preceding wheels and also to permit of removing any one of the wheels in case of its being damaged, I provide an interlocking mechanism of the construction presently to be described in detail and shown in Figs. 2, 3, and 4.

The spindle or axle I is fitted loosely in the heads K', screwed or otherwise secured on the outer ends of a tube K, carrying the bearings L for the balls L', engaging bearings in the hub of the wheels C, C', or $C^2$ to form the usual ball-bearing, as will be readily understood by reference to Fig. 2. On the tube K are secured or formed collars $K^2$, adapted to be engaged by the forked ends $E^3$ of the members of the front fork E' or $E^2$, so that the said fork may be set upon the said collars or removed therefrom whenever desired.

In order to securely hold the forked end $E^3$ of each of the forks E' or $E^2$ in place on the said collars $K^2$, I provide a lock-arm N in the form of a fork and mounted to turn on suitable bearings formed on each forked end $E^3$, so that when the fork of said lock-arm N registers with the forked end $E^3$ then the latter can be set on the collar or removed therefrom; but when the arm N is turned to carry its fork out of register with the fork of the end $E^3$ then the latter cannot be removed from the collar $K^2$.

One of the lock-arms N is provided with a handle N' for conveniently turning this arm, and as this arm is also engaged by a pin $K^3$, projecting from the collar $K^2$, it follows that upon turning the lock-arm N it causes a turning of the tube K, and as the other collar $K^2$ is likewise provided with a pin $K^3$ to engage the arm N on the other end it follows that this arm N is likewise turned to the same position as the handled arm N. Thus by the simple movement of the handled arm N, I can open or close the forked ends $E^3$ of the forks E' $E^2$, so as to permit their removal from the collars whenever desired or lock the same in place on the collars.

Each of the forked ends $E^3$ is provided with an inwardly-projecting pin $E^4$, engaging a spiral groove $K^4$, formed on the corresponding collar $K^2$, so that the turning of the tube K, as above described, causes the forked end $E^3$ to move inward against a washer O, held between the bearing L and the said forked end $E^3$ to insure a firm binding together of the several parts.

When it is desired to remove the entire wheel from the rear fork $D^3$ of the front fork E' to replace this wheel by another, I provide the following device, (likewise shown in Figs. 2 and 3:) The rear fork $D^3$ of the frame D or D' carries a box P, held in the fork and adjusted by the usual set-screw P', as plainly shown in Fig. 3, and on the box P is mounted to turn a forked arm Q, similar to the arm N and adapted to be moved in alinement with the fork $D^3$, so as to permit of sliding the spindle I' out of the fork $D^3$ of the forked arm Q, with the collar $K^2$ moving out of the registering forked end $E^3$ and its arm N.

On the box P is formed an inwardly-extending pin $P^2$, engaging a spiral groove $I^3$ on the outer end of the spindle I, so that when said spindle is turned then the box P is drawn inward against a washer O', abutting against the outer face of a nut $O^2$, screwing on the threaded end of the spindle I, as is plainly shown in Fig. 2. It is understood that the arm Q is engaged by a pin $I^4$, held on the spindle I, so that upon turning either of the two arms the spindle is revolved to cause an inward movement of the box P to press the same tightly in contact with the packing-ring O' and insure a proper uniting and antirattling of the entire device.

It is to be understood that the lock-arms N and Q are permanent parts of the bicycles.

Each of the heads G G' $G^2$ is formed with a cushion R, forming a rest for the inside of the rim of the wheel to be carried by the machine, the tire of the rim of this wheel abutting against an arm $G^4$, forming part of the head G, G', or $G^2$, so that this portion of the carried wheel is yieldingly mounted in the head G both on the inside and outside, it being understood that the pneumatic tire resting against the arm $G^4$ cushions as well as the cushion R. The opposite end of the wheel B, B', or $B^2$ carried is held in an extension $D^4$, formed on the corresponding frame D or D', thus establishing a connection by the carried wheel between the two adjacent bicycles to take any shocks incident to the machine going over rough ground, especially as the two frames of adjacent bicycles are connected with each other at the spindle I or I', as previously explained.

Each head G G' $G^2$ is made in two sections hinged together to permit of opening the sections to remove the handle-bar F, F', or $F^2$ and to place the said handle-bar in the forked end $E^3$ of the front fork E' or $E^2$, as shown in Fig. 10, and lock the said handle-bar in place by the arms N in the same manner as locking the forked ends $E^3$ to the collars $K^2$, as previously explained. The handled arm N after locking the forked ends $E^3$ on the collars $K^2$ or on the handle-bar F' is secured in place by a suitable ring S, held on the corresponding forked member. This arrangement is necessary when it is desired to drag the single bicycle over a plowed field, through underbrush, or the like, as the wheel is then pushed or drawn the same as a wheelbarrow, with the handle-bar F' locked to the front fork, as shown in Fig. 10. To prevent the front fork from turning in the steering-head of the frame, I provide an arm T, adjustably held on the lower front brace of the corresponding frame and adapted to be secured in either an active or inactive position by a suitable set-screw T', engaging the said lower front brace.

The arm T is provided with two spring-arms T², adapted to engage the members of the front fork, so as to securely hold the same in place when the arm T is pushed upward and secured in place by the set-screw T', as plainly indicated in Fig. 10. (See also Fig. 11.) When a single bicycle is used in this way, then the front wheel B, B', or B² is held in the head G, G', or G², with the lower end resting on the saddle, as indicated in Fig. 10.

In the modified form of the interlocking device (shown in Figs. 5, 7, and 9) I omit the tube K and arrange the several parts as follows: The spindle I⁴, as shown in Fig. 5, is provided at each end with a bearing L² for the balls L³, engaging the hub of the wheel C, and next to the bearing is placed on the spindle a collar K⁵, adapted to be straddled by the forked end E⁵ of the front fork E. A lock-arm N², mounted to turn on the ends E⁵, is adapted to open and close the same to lock and unlock the end E⁵ on the collar. In this construction the arm N² on each side must be turned independently and separately instead of turning both arms simultaneously, as described with reference to Fig. 2. The end E⁵ is provided with a pin E⁶ to engage a spiral groove K⁶ to draw the forked members of the front fork against washers O³ between the bearing L² and end E⁵. The forked box P², held in the forked end of the lower rear brace D⁴, is provided with a lock-arm Q² and engages with its pin P³ a spiral groove I⁵ in the spindle I⁴, the same as above described and shown in Fig. 2. The same construction, so far as the lower rear brace is concerned, prevails in the device shown in Fig. 7; but each member E⁷ of the front fork engages the socket U' of a ring U concentric to the spindle I⁶. The inner end of each fork member E⁵ instead of being forked, as previously described, is provided with a hook E⁸, adapted to be engaged by a hook V, held on the hub of a disk V', keyed to the spindle I⁶. Thus when the spindle is turned the hook V moves out of engagement with the hook E⁸, and the forked member can be lifted out of the socket U'.

In order to insure a ready detaching of the member E⁷ from the socket U', I provide a cam-arm V², secured on the hub of the disk V' and adapted to push the member E⁷ outward in the socket after the hook V has disengaged the hook E⁸ and the spindle is turned farther.

As shown in Fig. 9, the front fork is interlocked with the spindle I⁷, the same as shown in Fig. 5; but the lower rear brace D⁵ is without a box and directly fitted on the end of the spindle, with its inner face resting on a flanged nut W and with its outer face on a washer W', forced up by a nut W², screwing on the outer threaded end of the spindle I⁷.

From the foregoing it will be seen that the machine can be readily and quickly separated for forming single bicycles, or the latter can be interlocked, as described, permitting the use of the machine by a body of troops. Three bicycles are shown interlocked in Fig. 1; but it is evident that any desired number of bicycles may be interlocked to accommodate a squad of men with corporal or other non-commissioned officer in charge and located on the front bicycle A. It is evident that as the wheels are interchangeable any damaged wheel can be readily removed and replaced by one of the carried wheels. It will further be seen that by the interlocking arrangement described the length of the entire machine is considerably less than the aggregate length of the same number of bicycles placed one behind the other, together for the necessary space to prevent collisions, and consequently when in use shortens the length of a column of troops on the march, thereby rendering the use of the bicycle possible by large masses of troops. The use of such a military bicycle prevents straggling and also permits of carrying wounded or disabled men who have sufficient strength left to sit in the saddle.

Firing from the machine is possible by some of the soldiers, as only the rider on the front bicycle has to give particular attention to the road, and the remaining ones are free to observe the country and to shoot, &c. It is evident that the machine can be propelled at a high rate of speed, owing to the reduced number of wheels running.

Having thus fully described my invention, I claim as new and desire to secure by Letters Patent—

1. An interlocking cycle, comprising a series of bicycles arranged one behind the other, the front wheel of the following bicycle being removed from its fork and such fork being interlocked with the rear spindle of the preceding bicycle, the removed front wheel being carried on the frames of the adjacent interlocked bicycles and forming a slightly-yielding connection between said frames, as described.

2. An interlocking cycle, comprising a series of bicycles arranged one behind the other and of which the front wheel of the following bicycle is removed from its fork and such fork is locked upon the rear spindle of the preceding bicycle, an extension on the rear portion of the frame of the preceding bicycle, and a cushioned arm on the head of the following bicycle, the removed front wheel being received in said extension and arm and forming a means of connection between the upper portions of the bicycles, substantially as set forth.

3. An interlocking cycle, comprising a series of bicycles arranged one behind the other and of which the front wheel of the following bicycle is removed from its fork and such fork supported upon the rear spindle of the preceding bicycle, collars carried by said rear spindle, forked lock-arms mounted to turn upon the ends of the front fork members and arranged to engage the collars of said rear spindle, and a connection between said lock-arms, whereby each one will be turned on turning the other, substantially as described.

4. An interlocking cycle, comprising a series of bicycles arranged one behind the other, the rear spindle of the preceding bicycle having annular grooves arranged to receive the front fork members of the following bicycle, said fork members being bifurcated at their lower ends, and a forked locking-arm mounted to rotate upon the bifurcated ends of said fork and arranged to lock said fork in said annular grooves, as described.

5. A bicycle provided with a rear-wheel spindle formed with spiral grooves, rear lower braces, a forked box held in the forked end of each brace and provided with a pin engaging the said groove, whereby the brace is drawn inward or outward on turning the spindle, a forked lock-arm mounted to turn on said box and by which the forked end of said box is opened and closed, and a pin on said spindle and engaging said lock-arm, whereby said spindle is turned on turning said lock-arm, substantially as described.

6. A bicycle, provided with a rear-wheel spindle, a forked box on said spindle and carrying the bifurcated end of the rear lower brace, a connection between said box and spindle and by which the brace is drawn inward or outward on turning said spindle, and a lock-arm mounted to turn on said box, said lock-arm, when it is turned, turning the spindle and opening and closing the forked end of the box upon said spindle to hold or release the same, substantially as described.

7. A bicycle provided with a rear fork, a spindle received in said fork, and a forked arm held to turn on said rear fork and having its members receiving the spindle between them to hold the spindle in place, the fork of said arm being brought to register with the opening in the ends of the rear fork of the bicycle to release said spindle, substantially as set forth.

8. A bicycle provided with a rear fork having each member provided with bearings in which is received the spindle, and a forked lock-arm mounted to turn on said bearing and arranged to lock the spindle therein and to open the bearing to release the spindle, substantially as shown and described.

9. An interlocking cycle, provided with collars carried by the spindle of the rear wheel, a front fork adapted to engage with its forked members the said collars, and a forked lock-arm mounted to turn on the said members and adapted to lock the same on the said collars, and means for turning the said arms simultaneously, substantially as shown and described.

10. An interlocking cycle, provided with collars carried by the spindle of the rear wheel, a front fork adapted to engage with its forked members the said collars, and a forked lock-arm mounted to turn on the said members and adapted to lock the same on the said collars, and a pin projecting from the said forked member to engage a spiral groove in the said collar to draw the members inwardly on turning the collars, substantially as shown and described.

11. An interlocking cycle provided with collars carried by the spindle of the rear wheel, a front fork having forked members straddling said collars, forked lock-arms mounted to turn on said members and locking the same on said collars, a handle on one of said lock-arms, and a ring on one of the front fork members and arranged to engage said handle to hold said lock-arms in closed position, substantially as set forth.

12. An interlocking cycle, provided with collars carried by the spindle of the rear wheel and each formed with a spiral groove, and a front fork adapted to straddle with its forked ends the said collars, and a pin on each end to engage the said groove to draw the members toward each other on turning the collars, and means for simultaneously turning the said collars, as set forth.

13. An interlocking bicycle provided with rear lower braces, a forked box held in the forked end of each brace, a rear-wheel spindle carried in said boxes, and a forked lock-arm mounted to turn on each box and arranged to open and close the forked end of the same on said spindle, substantially as described.

14. An interlocking bicycle, provided with a rear-wheel spindle formed with spiral grooves, a box on the said spindle and carrying the rear lower brace, the said box being provided with a pin engaging the said groove to draw the lower rear brace inward or outward on turning the spindle, substantially as shown and described.

15. A bicycle provided with a rear-wheel spindle, rear lower braces, a forked box held in the forked end of each brace, and a forked lock-arm mounted to turn on the said box and by which the forked end of said box is opened and closed, the said lock-arm being connected with the said spindle, whereby said spindle is turned on turning said lock-arm, substantially as shown and described.

16. An interlocking bicycle having a handle-bar head formed in two sections hinged together, one of said sections having extending upwardly from it an open bifurcated arm which is shaped to receive the tire and rim of a wheel, substantially as set forth.

17. The combination with an interlocking bicycle, of an arm held in the lower front brace of the bicycle, said arm being provided with a set-screw by which it is adjusted along said brace, and two spring-arms arranged to engage the members of the front fork and hold the same from turning, substantially as described.

18. An interlocking bicycle provided with a front fork having its members bifurcated at their lower ends to receive the front-wheel spindle, forked lock-arms mounted to turn on the said ends, and means for locking the said arms in a closed position and to the said members, substantially as described.

19. A bicycle provided with a forked locking-arm on the lower end of its front fork member, and a handle-bar arranged to be received in said fork and locked therein by said arm, substantially as described.

20. A bicycle provided with fork members formed with bifurcated ends, forked locking-arms mounted to turn on said bifurcated ends of the members, a handle-bar arranged to be received in said ends and locked therein by said locking-arms, and means for holding said arms in locked position substantially as shown and described.

21. An interlocking cycle, comprising a series of bicycles, each complete in itself and having its rear-wheel spindle loosely received in heads K', secured on the outer ends of the tube K, and collars K² secured on said tube K, and its front fork provided with a locking device, each bicycle of the series except the first having its front wheel removed from its fork and such fork attached to the rear spindle of the preceding bicycle, being locked thereon by said locking device, and a yielding connection between the upper portions of the frames of adjacent bicycles, substantially as described.

22. An interlocking military cycle, comprising a series of bicycles arranged one behind the other, all alike and each complete in itself, each bicycle except the first of the series having its front wheel removed from its fork and such fork supported upon the rear spindle of the preceding bicycle, a permanent and complete locking device carried on the front fork and arranged to lock said fork upon said rear spindle, and hook extensions formed at the rear of the frame and at the head of each bicycle, the removed front wheels being supported between the adjacent extensions of the frames of adjacent bicycles and serving to brace said frames, as described.

OSCAR I. STRAUB.

Witnesses:
J. FRED. ACKER,
JNO. M. RITTER.